United States Patent
Yumoto et al.

(10) Patent No.: US 7,820,327 B2
(45) Date of Patent: Oct. 26, 2010

(54) LITHIUM TITANATE AND LITHIUM CELLS AND BATTERIES INCLUDING THE SAME

(75) Inventors: Hiroyuki Yumoto, Fishers, IN (US); Taison Tan, Fishers, IN (US); Derrick Buck, Pendleton, IN (US)

(73) Assignee: EnerDel, Inc., Indianapolis, IN (US)

( * ) Notice: Subject to any disclaimer, the term of this patent is extended or adjusted under 35 U.S.C. 154(b) by 272 days.

(21) Appl. No.: 12/015,901

(22) Filed: Jan. 17, 2008

(65) Prior Publication Data

US 2008/0226987 A1    Sep. 18, 2008

Related U.S. Application Data

(63) Continuation-in-part of application No. 11/462,520, filed on Aug. 4, 2006, now Pat. No. 7,541,016.

(60) Provisional application No. 60/880,818, filed on Jan. 17, 2007, provisional application No. 60/881,263, filed on Jan. 19, 2007, provisional application No. 60/899,089, filed on Feb. 2, 2007, provisional application No. 60/744,635, filed on Apr. 11, 2006.

(51) Int. Cl.
    *H01M 4/58*    (2010.01)

(52) U.S. Cl. .................. 429/231.5; 429/231.1; 429/209; 423/598

(58) Field of Classification Search .................. 180/313; 423/69, 71, 598; 429/24, 40, 209, 231.1, 429/231.5, 231.95

See application file for complete search history.

(56) References Cited

U.S. PATENT DOCUMENTS

| | | | | |
|---|---|---|---|---|
| 5,545,468 A | * | 8/1996 | Koshiba et al. | .......... 429/231.1 |
| 6,022,640 A | * | 2/2000 | Takada et al. | .......... 429/231.95 |
| 6,139,815 A | * | 10/2000 | Atsumi et al. | ............... 423/598 |
| 6,274,271 B1 | | 8/2001 | Koshiba et al. | |
| 6,645,673 B2 | * | 11/2003 | Yamawaki et al. | ........ 429/231.5 |
| 6,881,393 B2 | | 4/2005 | Spitler et al. | |
| 6,890,510 B2 | | 5/2005 | Spitler et al. | |
| 7,303,840 B2 | * | 12/2007 | Thackeray et al. | ..... 429/231.95 |
| 2001/0031401 A1 | * | 10/2001 | Yamawaki et al. | ........ 429/231.1 |
| 2002/0064704 A1 | * | 5/2002 | Thackeray et al. | ............ 429/50 |
| 2004/0043295 A1 | * | 3/2004 | Rodriguez et al. | .......... 429/303 |
| 2005/0019670 A1 | * | 1/2005 | Amine et al. | ............... 429/326 |
| 2005/0064282 A1 | * | 3/2005 | Inagaki et al. | ............... 429/163 |
| 2006/0068272 A1 | * | 3/2006 | Takami et al. | .................. 429/62 |

* cited by examiner

*Primary Examiner*—Timothy C Vanoy
*Assistant Examiner*—Richard M Rump
(74) *Attorney, Agent, or Firm*—Novak Druce + Quigg LLP; Joseph W. Bain; Gregory M. Lefkowitz

(57) ABSTRACT

An active material suitable for use in lithium cells comprises lithium titanate having a surface and a material disposed on the surface is provided. The material is non-reactive with an electrolyte within a range of potential vs. lithium of from 0 V to 4 V. A variety of lithium cells including lithium titanate are also provided. The lithium titanate is typically of the general formula: $Li_4Ti_5O_{12-x}$, wherein x is greater than 0. Further, a cell module is provided. The cell module comprises a plurality of lithium cells each having a soft outer packaging and assembled in an environment where water content in the environment is controlled.

32 Claims, 13 Drawing Sheets

LITHIUM TITANATE AND LITHIUM CELLS AND BATTERIES INCLUDING THE SAME

CROSS REFERENCE TO RELATED APPLICATIONS

This application claims the benefit of U.S. Provisional Patent Application Ser. No. 60/880,818, filed on Jan. 17, 2007, U.S. Provisional Patent Application Ser. No. 60/881,263, filed on Jan. 19, 2007, and U.S. Provisional Patent Application Ser. No. 60/899,089, filed on Feb. 2, 2007, all of which are incorporated herewith in their entirety; and is a continuation-in-part of U.S. patent application Ser. No. 11/462,520 filed on Aug. 4, 2006, which claimed priority to U.S. Provisional Patent Application Ser. No. 60/744,635 filed Apr. 11, 2006, both of which are incorporated herewith in their entirety.

FIELD OF THE INVENTION

This present invention generally relates to lithium cells and lithium batteries, and more specifically to lithium ion cells and lithium ion batteries.

DESCRIPTION OF THE RELATED ART

Motor vehicles such as, for example, hybrid vehicles use multiple propulsion systems to provide motive power. The most common hybrid vehicles are gasoline-electric hybrid vehicles, which include both an internal-combustion engine (ICE) and an electric motor. The gasoline-electric hybrid vehicles use gasoline to power the ICE, and an electric battery to power the electric motor. The gasoline-electric hybrid vehicles recharge their batteries by capturing kinetic energy. The kinetic energy may be provided via regenerative braking or, when cruising or idling, from the output of the ICE. This contrasts with pure electric vehicles, which use batteries charged by an external source such as a power grid or a range extending trailer.

The batteries include rechargeable lithium-based cells that typically comprise two dissimilar electrodes, i.e., an anode and a cathode, that are immersed in an ion conducting electrolyte, with a separator positioned between the two electrodes. Electrical energy is produced in the cells by an electrochemical reaction that occurs between the two dissimilar electrodes.

The largest demand placed on the battery occurs when it must supply current to operate the electric motor during acceleration, especially during start-up of the electric motor. The amperage requirements of the electric motor may be over several hundred amps. Most types of batteries that are capable of supplying the necessary amperage have a large volume or require bulky packaging, which results in excessive weight of the batteries and adds cost to the batteries. At the same time, such high currents are only required for short periods of time, usually seconds. Therefore, so called "high-rate" batteries, which provide high currents for short periods of time, are typically ideal for hybrid and pure electric vehicle applications.

Rechargeable batteries that include rechargeable lithium-based cells, which may be characterized as either lithium cells, lithium ion cells, or lithium polymer cells, combine high electric power-generating capacity with the potential for power and cycle-life needed to enable the hybrid vehicles to meet performance standards while remaining economical. By "high electric power-generating capacity", it is meant that the rechargeable batteries have four times the energy density of lead-acid batteries and two to three times the energy density of nickel-cadmium and nickel-metal hydride batteries. Rechargeable batteries including the lithium-based cells also have the potential to be one of the lowest-cost battery systems.

Lithium titanate represented by the formula $Li_4Ti_5O_{12}$ (or $Li_{4/3}Ti_{5/3}O_4$) is considered to be one of the most prospective materials for use in the anodes of rechargeable lithium ion and lithium polymer cells. Lithium titanate, $Li_4Ti_5O_{12}$, is known from A. Deschanvers et al. (Mater. Res. Bull., v. 6, 1971, p. 699). As it was later published by K. M. Colbow et al. (J. of Power Sources, v. 26, N. 3/4, May 16, 1989, pp. 397-402), $Li_4Ti_5O_{12}$ is able to act in a reversible electrochemical reaction, while elemental lithium is incapable of such reversible reactions. After detailed research conducted by T. Ozhuku et al. (J. of Electrochemical Society, v. 142, N. 5, 1995, pp. 1431-1435) lithium titanate started to become considered for use as an anode material for rocking-chair type lithium cells. In fact, U.S. Pat. No. 5,545,468 to Koshiba et al. discloses the use of a lithium titanate having varying ratios of lithium to titanium in the lithium titanate. More specifically, the lithium titanate of the '468 patent is of the formula $Li_xTi_yO_4$, wherein $0.8 \leq x \leq 1.4$ and $1.6 \leq y \leq 2.2$, in a cathode for a lithium cell. The '468 patent specifies that fundamentally, $x+y \approx 3$. In other words, the '468 patent teaches that the lithium titanate may include different ratios of lithium to titanium, so long as the amount of lithium and titanium together equal about 3 such that there is a stoichiometric amount of lithium and titanium to oxygen. United States Patent Publication No. 2002/0197532 to Thackeray et al. also discloses a lithium titanate that is used as an anode in a lithium cell. The lithium titanate may be a stoichiometric or defect spinel, in which the distribution of lithium can vary from compound to compound.

In addition to an ability to act in the reversible electrochemical reaction, $Li_4Ti_5O_{12}$ also has other advantages that make it useful in rechargeable lithium-based cells. For example, due to a unique low volume change of the lithium titanate during the charge and discharge processes, the lithium titanate has excellent cycleability, i.e., many cycles of charging and discharging may occur without deterioration of the cells. The excellent cycleability of the lithium titanate is primarily due to a cubic spinel structure of $Li_4Ti_5O_{12}$. According to data of S. Scharner et al. (J. of Electrochemical Society, v. 146, N. 3, 1999, pp. 857-861) a lattice parameter of the cubic spinel structure (cubic, Sp. gr. Fd-3m (227)) varies from 8.3595 to 8.3538 Å for extreme states during charging and discharging. This linear parameter change is equal to a volume change of about 0.2%. $Li_4Ti_5O_{12}$ has an electrochemical potential versus elemental lithium of about 1.55 V and can be intercalated with lithium to produce an intercalated lithium titanate represented by the formula $Li_7Ti_5O_{12}$, which has a theoretical electric power-generating capacity of up to and including 175 mA*hrs/g.

Another advantage of $Li_4Ti_5O_{12}$ is that it has a flat discharge curve. More specifically, the charge and discharge processes of $Li_4Ti_5O_{12}$ take place in a two-phase system. $Li_4Ti_5O_{12}$ has a spinel structure and, during charging, transforms into $Li_7Ti_5O_{12}$, which has an ordered rock-salt type structure. As a result, electric potential during the charge and discharge processes is determined by electrochemical equilibrium of the $Li_4Ti_5O_{12}/Li_7Ti_5O_{12}$ pair, and is not dependant on lithium concentration. This is in contrast to the discharge curve of most other electrode materials for lithium power sources, which maintain their structure during the charge and discharge processes. For example, although a transition of a charged phase in most cathode materials such as $LiCoO_2$ is predetermined, there is still an extended limit of variable composition $Li_xCoO_2$ between these structures. As a result, electrical potential of materials such as $LiCoO_2$ depends on a lithium concentration in the $LiCoO_2$, i.e., a state of charge or discharge. Thus, a discharge curve in materials in which the electrical potential is dependent on the lithium concentration in the material is typically inclined and is often a step-like curve.

There is a general consensus within the art that maintenance of excellent electric power-generating capacity correlates to excellent electronic conductivity. $Li_4Ti_5O_{12}$ includes titanium in a highest oxidation degree of +4, which correlates to very low electronic conductivity. An electronic conductivity of similar compounds is so low that many of those compounds are borderline dielectrics or insulators. As such, power generating capacity of $Li_4Ti_5O_{12}$ is less than ideal. The same holds true for the lithium titanates of the '468 patent and the '532 publication, as set forth above.

Typically, electronic conductivity of the $Li_4Ti_5O_{12}$ is improved by doping the $Li_4Ti_5O_{12}$ with 3d-elements, as disclosed by M. Nakayama et al (Solid State Ionics, v. 117, I. 3-4, 2 Feb. 1999, pp. 265-271). For example, electronic conductivity of $Li[Li_{(1-x)/3}Cr_xTi_{(5-2x)/3}]O_4$, which is considered to be a solid solution between $Li_4Ti_5O_{12}$ and $LiCrTiO_4$, is better than electronic conductivity of the $Li_4Ti_5O_{12}$. However, an increase in the amount of Cr ions substituted for titanium ions in the $Li_4Ti_5O_{12}$ also decreases reversible electric power-generating capacity, as compared to $Li_4Ti_5O_{12}$, due to electrochemical inactivity attributable to the presence of the Cr ions. The presence of the Cr ions lowers area specific impedance (ASI) and increases rate capability, as compared to ASI and rate capability of $Li_4Ti_5O_{12}$. The loss in capacity is substantially equal to the share of replaced titanium.

Other attempts to replace the titanium in lithium titanates exhibit similar drawbacks. For example, substitution of titanium in $Li_4Ti_5O_{12}$ with vanadium, manganese, and iron results in significant loss of reversible electric power-generating capacity during a first charge-discharge cycle. See P. Kubiak, A. Garsia, M. Womes, L. Aldon, J. Olivier-Fourcade, P.-E. Lippens, J.-C. Jumas "Phase transition in the spinel $Li_4Ti_5O_{12}$ induced by lithium insertion. Influence of the substitution Ti/V, Ti/Mn, Ti/Fe" (J. of Power Sources, v. 119-121, Jun. 1, 2003, pp. 626-630).

In view of the foregoing, there remains an opportunity to provide a lithium titanate that is modified to exhibit excellent electronic conductivity while maintaining reversible electric power-generating capacity that is characteristic of lithium titanate. There is also an opportunity to provide lithium-based cells and batteries that include the lithium titanate.

SUMMARY OF THE INVENTION AND ADVANTAGES

The subject invention provides a lithium titanate having the following formula:

$Li_4Ti_5O_{12-x}$ wherein x is greater than 0. The subject invention further provides a method of forming the lithium titanate. The method includes the step of providing a mixture of titanium dioxide and a lithium-based component. The mixture is sintered in a gaseous atmosphere comprising a reducing agent to form the lithium titanate having the above formula. The subject invention further comprises a lithium-based cell including an electrolyte, an anode, and a cathode. At least one of the anode and the cathode comprises lithium titanate having the above formula.

The subject invention further provides an active material suitable for use in lithium cells. The active material comprises lithium titanate having a surface. A material is disposed on the surface of the lithium titanate. The material is non-reactive with an electrolyte within a range of potential vs. lithium of from 0 V to 4 V while the active material is in the presence of the electrolyte.

The subject invention further provides a variety of lithium cells. In one embodiment, a lithium cell comprises at least two electrodes each comprising lithium titanate. The lithium cell has an electrode potential in a general condition of use that does not drop below 1.3 V. In another embodiment, a lithium cell comprises lithium titanate, an electrolyte that decomposes at a potential vs. lithium of from 1.5 V to 3.0 V, and a surface film disposed on the lithium titanate. The surface film is formed by the electrolyte. In another embodiment, a lithium cell comprises at least one electrode comprising lithium titanate, and a non-fluorinated binder. In yet another embodiment, a lithium cell comprises at least one electrode. The electrode comprises a first lithium titanate and a second lithium titanate different than the first lithium titanate. The first lithium titanate is of the general formula: $Li_4Ti_5O_{12}$, and the second lithium titanate is of the general formula: $Li_4Ti_5O_{12-x}$, wherein x is greater than 0. The second lithium titanate is present in the electrode in an amount greater than that of the first lithium titanate. In another embodiment, a lithium cell comprises lithium titanate and a gas absorbing material.

The subject invention yet further provides a cell module. The cell module comprises a plurality of lithium cells each having a soft outer packaging and assembled in an environment where water content in the environment is controlled.

The lithium titanate, as indicated in the above formula, is deficient of oxygen, which increases electronic conductivity of the lithium titanate by typically two orders over electronic conductivity of a stoichiometric lithium titanate, while avoiding loss of reversible electric power-generating capacity that typically occurs when doping is used to replace titanium in the lithium titanate with atoms that provide higher electronic conductivity. As such, the lithium titanate of the present invention is suitable for lithium-based cells that are used in rechargeable batteries that are a power source for electric motors in gasoline-electric hybrid vehicles, and the lithium titanate of the present invention materially contributes to the conservation of energy resources by improving performance of the lithium-based cells.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

A lithium titanate of the present invention is useful in lithium-based cells. The lithium-based cells including the lithium titanate of the present invention are useful in many applications, but are particularly useful in rechargeable batteries for vehicles 10, such as hybrid or electric vehicles 10; however, it is to be appreciated that the lithium-based cells may be used in non-rechargeable batteries. The rechargeable batteries are a power source 12 for an electric motor of the vehicles 10. The lithium-based cells may also be known as lithium ion cells. In addition, lithium ion batteries are also referred to as secondary batteries and vice versa. Often, lithium ion batteries in particular are referred to as rocking-chair type batteries because lithium ions move between positive and negative electrodes, which are described further below.

The lithium-based cells include an electrolyte, an anode, and a cathode. It is to be appreciated that description of the anode and the cathode are interchangeable with description of the electrode (or electrodes) in description of the present invention. Electrolytes for the lithium-based cells are typically organic electrolytes and/or non-aqueous lithium ion-conducting electrolytes and are known in the art. Suitable electrolytes, for purposes of the present invention, are described in further detail below. Typically, at least one of the anode and the cathode includes the lithium titanate of the present invention. For example, the lithium-based cell may be further defined as a lithium cell, wherein the cathode comprises the lithium titanate of the present invention. The lithium titanate is typically present in the cathode in an amount of at least 80 parts by weight, more typically from 80 to 90 parts by weight, most typically in an amount of about 82 parts by weight based on the total weight of the cathode. In addition to the lithium titanate, the cathode in the lithium cell also typically includes a conductive agent such as carbon black along with a binder agent (or adhesive), such as polyvinylidene fluoride (PVDF), which make up the balance of the cathode. More specifically, the carbon black is typically present in an amount of from 8 to 10 parts by weight, more typically about 8 parts by weight based on the total weight of the cathode, and the binder agent is typically present in an amount of from 8 to 12 parts by weight, more typically about 10 parts by weight, based on the total weight of the cathode. The anode in the lithium cells is typically a lithium metal or lithium alloy with magnesium or aluminum.

Alternatively, the lithium-based cell may be further defined as one of a lithium ion cell and a lithium polymer cell, wherein the anode comprises the lithium titanate of the present invention in the amounts set forth above.

Figure 1:
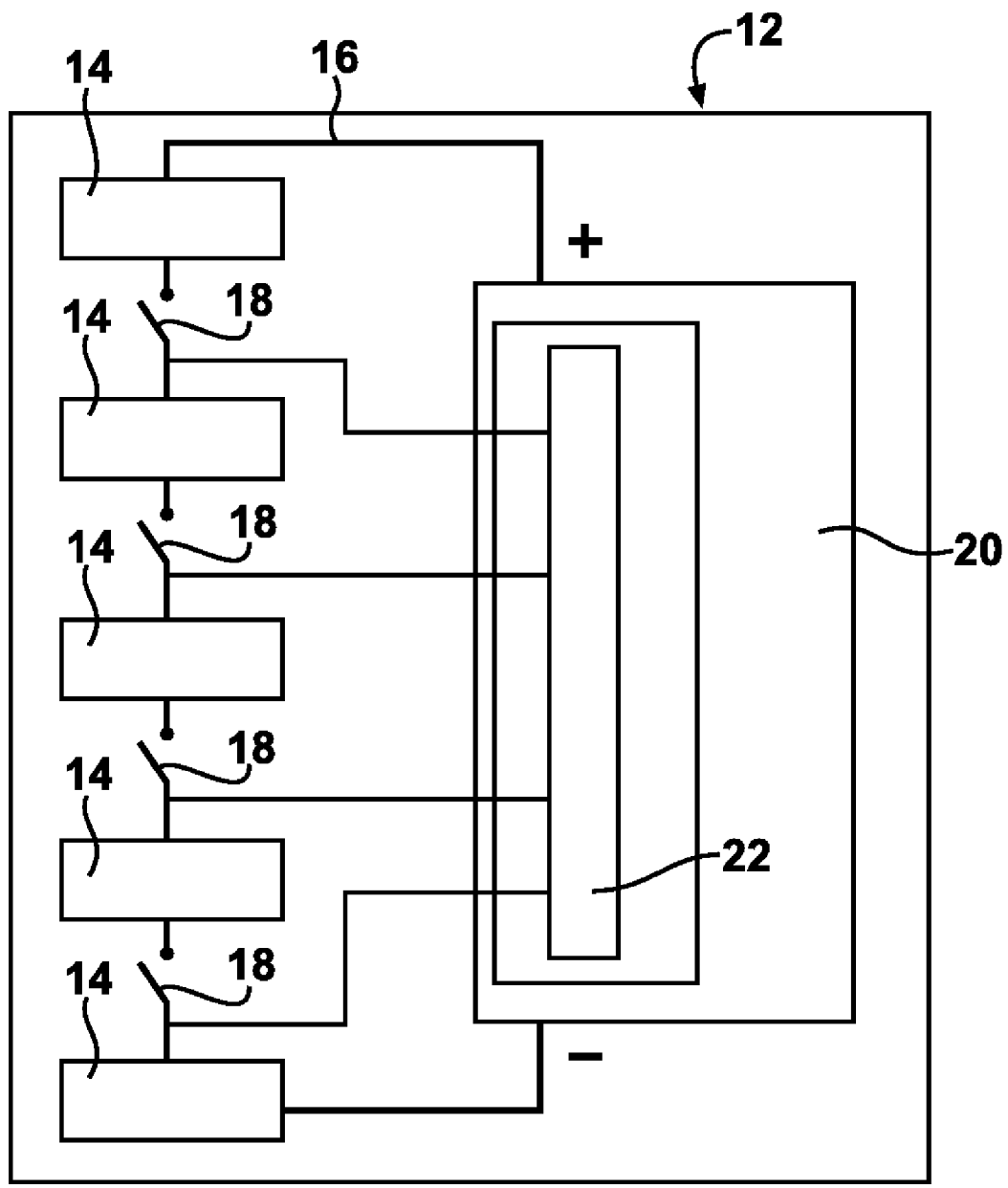
FIG. 1 is a schematic view of a rechargeable battery including lithium-based cells.
Figure 2:
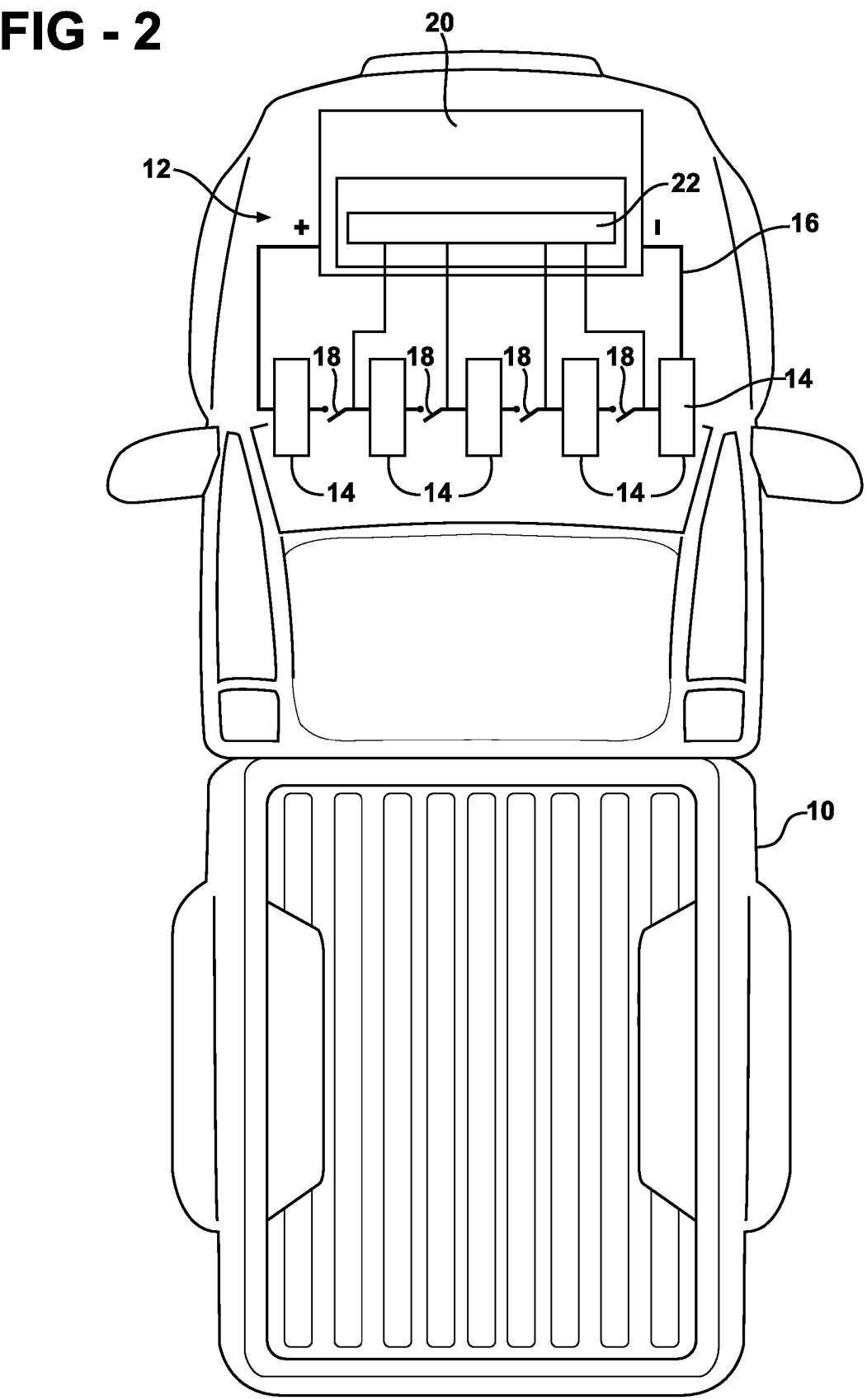
FIG. 2 is a schematic view of a vehicle including the rechargeable battery of FIG. 2.

When used in rechargeable batteries for hybrid or electric vehicles 10, the cells are typically used in a battery pack, represented by 14 in FIGS. 1 and 2. The battery packs 14 typically include four rows of the cells that are interconnected and extend along each row in overlapping relationship. Each row typically includes five stacks of the cells. However, it is to be appreciated that other configurations of the cells within the battery pack 14 may also be used. Other configurations of batteries and cells are described further below.

As known in the art, the rechargeable batteries typically include a plurality of the battery packs 14 connected in a circuit in order to provide sufficient energy for powering the vehicle 10. As shown in FIGS. 1 and 2, the circuit is configured with switches 18 and a battery management system 20 disposed in the circuit 16. The battery management system 20 includes a switch control and interface circuit 22 to control energy usage from and recharge of the cells in the battery packs 14.

The lithium titanate of the present invention has the following formula:

$Li_4Ti_5O_{12-x}$ wherein x is greater than 0. Typically, $0<x<0.02$. In other words, the lithium titanate of the present invention is deficient of oxygen, which has excellent electronic conductivity, as compared to lithium titanate of the above formula that is not deficient of oxygen, e.g. $Li_4Ti_5O_{12}$. At the same time, concentration of lithium in the lithium titanate of the present invention remains the same as for lithium titanate that is not deficient of oxygen. As a result, expected reversible electric power-generating capacity of the lithium titanate of the present invention will remain the same as the reversible electric power-generating capacity of lithium titanate that includes a stoichiometric amount of oxygen.

Figure 3:
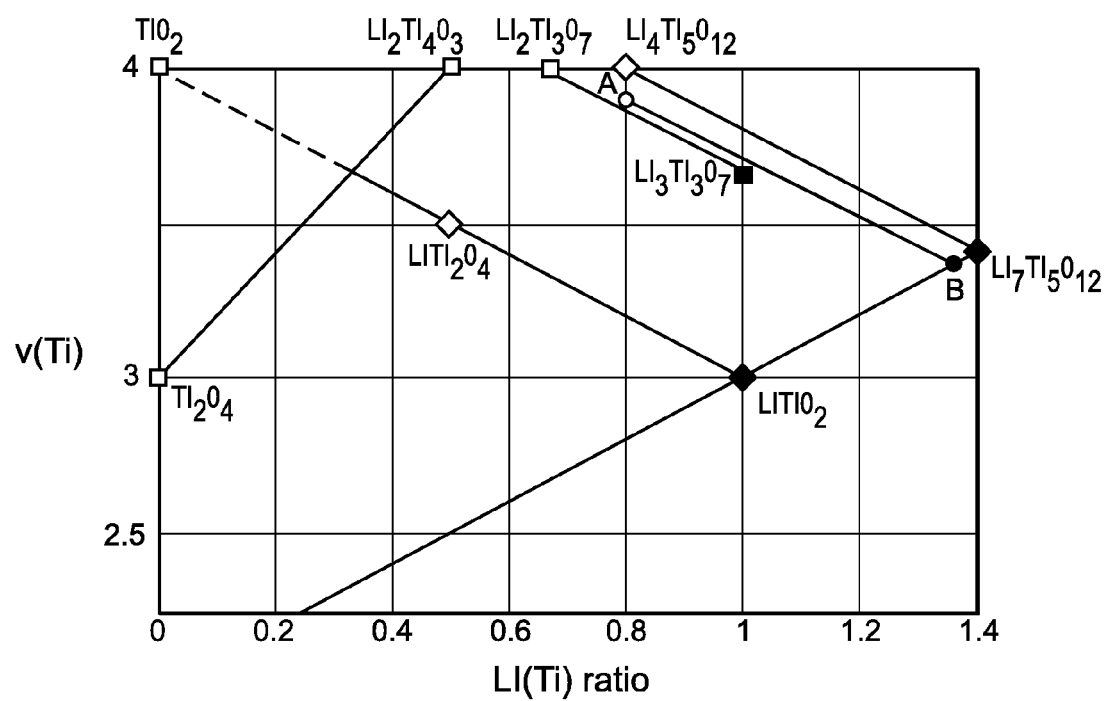
FIG. 3 is a lithium titanate composition-valence diagram showing a relationship between ratios of lithium to titanium in lithium titanate to a valence of titanium in the lithium titanate, with diamonds indicating spinel structures, squares indicating non-spinel structures, with filled symbols indicating lithium titanates that include intercalated lithium ions.

The effect on electronic conductivity as a result of the oxygen deficiency is attributable to changes in an oxidation state, i.e., valence, of the titanium in the lithium titanate. More specifically, lithium titanates that include titanium atoms in a +3 oxidation state exhibit high electronic conductivity that is characteristic of metal-like material, while lithium titanates that include titanium atoms in a +4 oxidation state exhibit low electronic conductivity that is characteristic of a dielectric material. Referring to FIG. 3, the oxidation state of various lithium titanates is represented on the vertical axis as v(Ti), i.e., valence of titanium. As such, FIG. 3 indicates the relative electronic conductivity of the various lithium titanates, at various states of intercalation, with higher v(Ti) correlating to lower electronic conductivity. $Li_4Ti_5O_{12}$ is an example of lithium titanate having the titanium atoms in the +4 oxidation state.

During electrochemical intercalation or charging of conventional $Li_4Ti_5O_{12}$, phase transition from spinel to "rock salt"-type occurs wherein three lithium atoms are intercalated into the conventional $Li_4Ti_5O_{12}$ to produce $Li_7Ti_5O_{12}$. $Li_7Ti_5O_{12}$ has a higher electronic conductivity than the conventional $Li_4Ti_5O_{12}$ due to the transformation of titanium atoms in the conventional $Li_4Ti_5O_{12}$ from the +4 oxidation state to the +3 oxidation state during intercalation, as shown in FIG. 3 and as represented by the following equation:

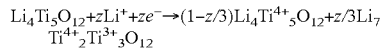

$$Li_4Ti_5O_{12}+zLi^++ze^-\rightarrow(1-z/3)Li_4Ti^{4+}{}_5O_{12}+z/3Li_7Ti^{4+}{}_2Ti^{3+}{}_3O_{12}$$

wherein z represents the number of lithium atoms that are intercalated into the $Li_4Ti_5O_{12}$. As such, the conventional $Li_4Ti_5O_{12}$ exhibits variable electronic conductivity based on the state of intercalation and zones of low and high electronic conductivity may exist during intercalation and discharge due to the disparate differences in electronic conductivity between the conventional $Li_4Ti_5O_{12}$ and $Li_7Ti_5O_{12}$. Poor electronic conductivity of the conventional $Li_4Ti_5O_{12}$ causes initial "training" of the cells by low current as well as prevention of a complete charge. These circumstances extremely limit opportunities of use of the conventional $Li_4Ti_5O_{12}$ for high rate applications.

In accordance with the present invention, it was surprisingly found that the following relationship exists:

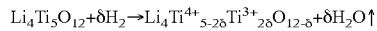

$$Li_4Ti_5O_{12}+\delta H_2 \rightarrow Li_4Ti^{4+}{}_{5-2\delta}Ti^{3+}{}_{2\delta}O_{12-\delta}+\delta H_2O\uparrow$$

In effect, reduction of $Li_4Ti_5O_{12}$ to form the $Li_4Ti_5O_{12-x}$ results in the transformation of titanium atoms in the $Li_4Ti_5O_{12}$ from the +4 oxidation state to the +3 oxidation state as a result of charge compensation, thereby exhibiting increased electronic conductivity of the $Li_4Ti_5O_{12-x}$ while retaining the same number of lithium and titanium atoms in the lithium titanate. Stated differently, an average valence of titanium in the lithium titanate of the present invention is less than 4. The practical result of the above finding is that the lithium titanate will exhibit less drastic changes in electronic conductivity at all stages of charge and discharge processes, as opposed to the conventional $Li_4Ti_5O_{12}$ that exhibits electronic conductivity that is near that of dielectric materials prior to charging, such that different zones of $Li_4Ti_5O_{12-x}$ and $Li_7Ti_5O_{12-x}$ will exhibit more uniform media for charge and discharge processes, as compared to conventional $Li_4Ti_5O_{12}$, which is advantageous for high-rate applications.

Since the same numbers of electrochemically active lithium and titanium atoms are present as are present in the $Li_4Ti_5O_{12}$, expected reversible electric power-generating capacity will be the same for the $Li_4Ti_5O_{12-x}$ as for the $Li_4Ti_5O_{12}$. The $Li_4Ti_5O_{12-x}$ also retains the same spinel structure as $Li_4Ti_5O_{12}$, which has excellent cycleability. As set forth above, typically, 0<x<0.02 in order to maintain the lithium titanate having the same spinel structure as the $Li_4Ti_5O_{12}$. More specifically, referring to FIG. 3, the lithium titanate of the present invention, by having the oxygen deficiency, shifts the $Li_4Ti_5O_{12-x}$ to a position represented by "A" in FIG. 3 due to the transformation of titanium atoms in the $Li_4Ti_5O_{12}$ from the +4 oxidation state to the +3 oxidation state, with the position represented by "B" indicating an intercalation state of the $Li_4Ti_5O_{12-x}$. The value of x, in order to maintain the same spinel structure as Li4Ti5O12, is limited since lithium titanate with structure of Li2Ti3O7 will form if the amount of titanium in the +3 oxidation state becomes too high. $Li_2Ti_3O_7$ has an orthorhombic crystal structure with space group Pbnm (62). Although $Li_2Ti_3O_7$ may be suitable for certain applications, the spinel structure of $Li_4Ti_5O_{12}$ is preferred due to the ability to intercalate more lithium into the structure than can be intercalated into the $Li_2Ti_3O_7$ and also due to the fact that $Li_4Ti_5O_{12}$ exhibits low volume change of from 8.3595 to 8.3538 Å between intercalated and deintercalated states, which provides the excellent cycleability.

A method of forming the $Li_4Ti_5O_{12-x}$ includes the step of providing a mixture of titanium dioxide and a lithium-based component. Titanium dioxide can be used both in the form of rutile and in the form of anatase, as well as any form of titanium oxide-hydroxide (such as $Ti(OH)_{2x}O_{2-x}$). Any lithium-based component that is typically used for forming $Li_4Ti_5O_{12}$ may be used. Typically, the lithium-based component is selected from the group of lithium carbonate, lithium hydroxide, lithium oxide, and combinations thereof, and the lithium-based component is typically at least 99% pure. Lithium salts or organic acids can also be used. Typically, the lithium-based component and titanium oxide are present in the mixture in amounts necessary to ensure an atomic ratio Li/Ti=0.8 in the final lithium titanate of the present invention.

The mixture including the titanium dioxide and the lithium-based component is sintered in a gaseous atmosphere comprising a reducing agent to form the lithium titanate. More specifically, the mixture is sintered at a temperature of at least 450° C., more typically from about 500 to 925° C., most typically from about 700 to about 920° C., for a period of at least 30 minutes, more typically from about 60 to about 180 minutes.

The reducing agent may be any agent that is capable of reducing the oxygen in the $Li_4Ti_5O_{12}$ and is typically selected from the group of hydrogen, a hydrocarbon, carbon monoxide and combinations thereof. The reducing agent is typically present in the gaseous atmosphere in a concentration of at least 0.1% by volume, more typically from about 1 to about 100% by volume, in order to sufficiently reduce the $Li_4Ti_5O_{12}$ to form the $Li_4Ti_5O_{12-x}$.

In addition to the reducing agent, the gaseous atmosphere typically includes another gas selected from the group of an inert, an inactive gas, and combinations thereof. Any inert gas may be used, such as any noble gas, in order to prevent unwanted side reactions during sintering and in order to prevent introduction of impurities into the $Li_4Ti_5O_{12-x}$. Inactive gas that may be used is, for example, pure nitrogen.

Other embodiments of the present invention will now be described. Specifically, other types of lithium cells (or lithium ion cells) and lithium batteries (or lithium ion batteries) are also provided by the subject invention. Typically, as described above, the lithium cells or batteries include positive (e.g. anode) and negative (e.g. cathode) electrodes. Generally, the positive and negative electrodes include a material or materials that can occlude lithium or lithium ions, such as those described and exemplified above.

In one embodiment, the negative electrode is a plate that comprises an active material that can reversibly occlude lithium seeds, e.g. a lithium transition metal oxide, a metallic current collecting material, e.g. copper foil, an adhesive (or a binder/binder agent) e.g. PVDF, styrene butadiene rubber (SBR), etc., and optionally, a conductive agent/auxiliary such as carbon black.

In one embodiment, the positive electrode is a plate that comprises an active material that can occlude lithium seeds, a metallic current collecting material, an adhesive, and typically a conductive auxiliary. The active material of the positive electrode may be the same as or different than the active material of the negative electrode. Further, the metallic current collecting material of the positive electrode may be the same as or different than the metallic current collecting material of the negative electrode. Yet further, the adhesive of the positive electrode may be the same as or different than the adhesive of the negative electrode. If employed, the conductive auxiliary of the positive electrode may be the same as or different than the conductive auxiliary of the negative electrode.

Examples of suitable lithium transition metal oxides, for purposes of the present invention include, but are not limited to, $LiMn_2O_4$, $LiCoO_2$ $LiNiO_2$, $LiFePO_4$, and combinations thereof. Optionally, titanium, aluminum, magnesium, nickel, manganese, and combinations thereof, may be used for doping transition metal sites, as understood by those skilled in the art. It is to be appreciated that the positive and/or negative electrodes may be in other configurations known in the art other than a plate configuration, such as a coiled and/or laminated configurations/structures.

The lithium cells or batteries also include an electrolyte, as described above. Typically, the electrolyte comprises a lithium salt dissolved in a non-water type solvent. Non-water type solvents can include those that are in a complete liquid, a complete solid, or a gel form between the complete liquid and solid. Suitable liquid electrolytes include, but are not limited to, alkyl carbonates, e.g. propylene carbonate and ethylene carbonate, dialkyl carbonates, cyclic ethers, cyclic esters, glymes, lactones, formates, esters, sulfones, nitrates, oxazoladinones, and combinations thereof. Suitable polymers used as solid electrolytes include, but are not limited to, polyethylene oxide (PEO), polymethylene-polyethylene oxide (MPEO), PVDF, polyphosphazenes (PPE), and combinations thereof. Suitable lithium salts include, but are not limited to, $LiPF_6$, $LiClO_4$, $LiSCN$, $LiAlCl_4$, $LiBF_4$, $LiN(CF_3SO_2)_2$, $LiCF_3SO_3$, $LiC(SO_2CF_3)_3$, $LiO_3SCF_2CF_3$, $LiC_6F_5SO_3$, $LiCF_3CO_2$, $LiAsF_6$, $LiSbF_6$, and combinations thereof. It is to be appreciated that the electrolyte may comprise various combinations of the components described and exemplified above, as understood by those skilled in the art.

If a liquid type and/or gel type electrolyte is employed, a separator is typically positioned between the positive and negative electrodes, and the electrolyte is held by the separator to prevent a short circuit within the cell. The separator may be any type of separator known in the art. In one embodiment, a polyolefin membrane such as a micropore polyethylene and/or polypropylene is employed as the separator. In another embodiment, a ceramic separator is employed. In one embodiment, a lithium ion battery has a negative electrode plate and positive electrode plate with the separator (optionally), positioned between a coiled structure and a laminated structure. The electrolyte is poured therein, and the battery is placed in a metallic or a metallic laminated case and sealed.

As described above, copper foil is generally used as the current collecting material for the negative electrode plate. Generally, to prepare the negative electrode plate, a slurry is applied over the copper foil, dried, and pressed. The slurry comprises the active material, the adhesive, and, optionally, the conductive auxiliary. It is to be appreciated that the aforementioned current collector can be made from other metals and/or alloys, including, but not limited to, nickel, titanium, stainless steel, aluminum, and copper, with the latter generally being preferred as previously described. In addition, the current collector can be manufactured into various forms, such as a sheet, a strip, a foil, a mesh, a net, a foamed metal plate, etc.

Typically, the lithium titanate of the present invention, as described and exemplified above, i.e., $Li_4Ti_5O_{12-x}$, is used as the active material for the negative electrode. As described (or alluded to) above, the lithium titanate has excellent cycling characteristics due to its small volumetric change that accompanies charging. In contemporary lithium cells and batteries, a film through a reduction decomposition of an electrolyte is generally formed on the surface of graphite, for example, that is used as a negative electrode in the cell or battery. Such a film inhibits the electrolyte from further decomposition. However, it is believed that lithium titanate does not have a film that is generally formed over the surface of the graphite. Therefore, it is believed that when a surface potential of lithium titanate drops below 1.2 V (vs. Li+/Li), a large amount of the electrolyte comprises a reducing decomposition and generates gas, which negatively affects cycling characteristics. It is also believed that the binder can also be reduced when the surface potential of lithium titanate drops below 1.2 V. To alleviate some of these potential issues, it is typically necessary that the negative electrode have the same or more capacity as the positive electrode when using the lithium titanate.

The present invention also provides an active material suitable for use in lithium cells, such as those described herein. The active material comprises lithium titanate having a surface, and a material disposed on the surface of the lithium titanate. The material is generally non-reactive with the electrolyte within a range of potential vs. lithium of from 0 V to 4 V while the active material is in the presence of the electrolyte. The lithium titanate is as described and exemplified above, i.e. $Li_4Ti_5O_{12-x}$. Typically, once formed, the material does not decompose the electrolyte. The material can also be referred to as a surface film or a film.

In one embodiment, a lithium cell of the present invention comprises at least two electrodes each comprising lithium titanate, e.g. $Li_4Ti_5O_{12-x}$, as described and exemplified above. The lithium cell has an electrode potential in a general condition of use that does not drop below 1.3 V. In another embodiment, a lithium cell of the present invention comprises lithium titanate, e.g. $Li_4Ti_5O_{12-x}$ as described and exemplified above, an electrolyte that decomposes at a potential vs. lithium of from 1.5 V to 3.0 V, and a surface film disposed on the lithium titanate. The surface film is formed by the electrolyte, as described above. The surface film prevents further decomposition of the electrolyte by preventing direct contact between the electrolyte and the lithium titanate. In one embodiment, the electrolyte comprises lithium bis(oxalato) borate (LiBOB). It is to be appreciated that other suitable electrolytes may also be used in addition or alternate to LiBOB, as long as the surface film is formed.

The present invention also provides a lithium cell comprising at least one electrode comprising lithium titanate, e.g. $Li_4Ti_5O_{12-x}$, as described and exemplified above. In one embodiment, the lithium cell comprises at least two electrodes, each of the electrodes comprising lithium titanate, e.g. $Li_4Ti_5O_{12-x}$, as described and exemplified above. In either embodiment, the lithium cell further comprises a non-fluorinated binder, i.e., the binder does not include fluorine in its makeup. Suitable non-fluorinated binders, for purposes of the present invention include, but are not limited to, the binders as described and exemplified above that do not include fluorine, e.g. SBR. In these embodiments, the non-fluorinated binder is typically used in the electrode or electrodes, as like use of the binder as described and exemplified above.

In certain embodiments, the electrode or electrodes comprise a first lithium titanate and a second lithium titanate different than the first lithium titanate. The first lithium titanate is of the formula: $Li_4Ti_5O_{12}$, as described above, and the second lithium titanate is that of the present invention, i.e., $Li_4Ti_5O_{12-x}$, as described and exemplified above. In certain embodiments, the second lithium titanate is disposed on at least a portion of a surface of the electrode, more preferably is disposed on a majority of the surface of the electrode, and most preferably is disposed on an entirety of the surface of the electrode. Accordingly, the second lithium titanate is typically present in the electrode in an amount greater than that of the first lithium titanate. For example, in certain embodiments, the electrode includes at least 10% more of the second lithium titanate relative to the first lithium titanate, by weight. Further, catalytic action of titanium can be reduced, and the decomposition of the binder and the electrolyte can be avoided by employing the second lithium titanate, i.e., $Li_4Ti_5O_{12-x}$, as described and exemplified above. Yet further, with charging, too large of a drop in negative electrode potential can be prevented by using the second lithium titanate in place of the first lithium titanate.

In certain embodiments, such as those described above, the non-fluorinated binder is employed because it is believed that fluorine type or fluorinated binders, i.e. binders have fluorine in their makeup, e.g. PVDF, PTFE, etc., are particularly weak against reduction. For example, there is a possibility that a fluorinated binder will decompose and generate, for example, hydrogen fluoride (HF). HF can be a highly corrosive compound, as understood in the art, and is known to be detrimental to a cell or battery when present therein. If such a gas is formed, such as with use of a fluorinated binder, expansion of the battery can be prevented by including a material that adsorbs gas that has been decomposed by lithium titanate inside the battery. Specifically, the present invention further provides a lithium cell comprising lithium titanate, e.g. $Li_4Ti_5O_{12-x}$, as described and exemplified above, and a gas absorbing material. Examples of suitable gas absorbing materials include, for purposes of the present invention include, but are not limited to, ZnO, $NaAlO_2$, silicon, and combinations thereof. The gas absorbing material can be retained by the separator, if employed. Typically, the lithium titanate and the gas absorbing material are mixed to form the electrode or electrodes. As described above, the batteries typically comprise a case, such that the gas absorbing material can also be retained by the case in addition to the separator, if employed.

The present invention further provides a cell module (or pack) comprising a plurality of lithium cells, such as those described and exemplified above. Each of the lithium cells have a soft outer packaging and are assembled in an environment where water content in the environment is controlled. The lithium cells typically include lithium titanate, i.e., $Li_4Ti_5O_{12-x}$, as described and exemplified above. In one embodiment, the cell module comprises at least 10 lithium cells. The lithium cells are typically assembled together in a configuration, and may be arranged in various configurations relative to one another, such as those described and illustrated above. The environment is typically a dry room, in order to adequately maintain low levels of water during assembly of the cells, batteries, and/or the cell module.

The cell module generally has a seal to enclose the lithium cells, and to prevent water from entering the cell module and/or the lithium cells. Various methods may be used to form the seal. For example, welding, clamping, and/or heat-sealing may be used. Generally, a welding seal, e.g., a hermetic seal, provides the best sealing performance for the cell module. Laser welded seals may be used, for example. Heat seal methods, such as those typically used to seal soft packages of metallic laminates, can also be used as they are generally simple processes. Suitable examples of soft outer packaging, for purposes of the present invention, include, but are not limited metals laminated with plastics, typically polyolefins, e.g. polypropylene, polyethylene, etc. Suitable metals, for purposes of the present invention, are known in the art, such as aluminum. Employing various types and thicknesses of plastics can decrease the amount of metal used in the soft outer packaging, thereby reducing weight and possibly cost of the cell module. Weight concerns are particularly important for hybrid electric vehicle (HEV) applications.

In these embodiments, it is important that water does not enter or break the seal during use or operable lifetime of the cell module. Water can have various detrimental effects on the cell module, as generally understood in the art. Specifically, water can react with the electrolyte, and can generate undesirable reaction products. For example, if the electrolyte comprises a fluorinated electrolyte, e.g. $LiPF_6$, HF can be formed via reaction with water, which causes issues as described and illustrated above. The same reaction may occur if the fluorinated binder is employed. Other side reaction involving water can also occur, as understood in the art. For example, metallic lithium can deactivate with contact with water. Non-fluorinated electrolytes and binders can generally be used to alleviate these problems. Water can be controlled to be very low in the components employed to make the cells and cell module, for example, water, if present in the electrolyte, can be kept to minimums, e.g. water present in ppm amounts or less. Other components can be dried prior to assembly of the cell module. Sealing performance and strength are significant because long term reliability is particular important for HEV applications.

The following examples are intended to illustrate and not to limit the present invention.

EXAMPLES

Lithium titanate of the present invention having the formula $Li_4Ti_5O_{12-x}$ is formed according to the method of the invention as set forth above. More specifically, conventional $Li_4Ti_5O_{12}$ is first formed by forming a mixture including titanium dioxide and a lithium-based compound. The mixture is formed by introducing the titanium dioxide and the lithium-based compound into a vessel in the amounts shown in Table 1. The titanium dioxide and the lithium-based compound are mixed and milled in a ball mill for a period of about 60 minutes at least 150 rpm rotation speed using a particle size distribution measurement till particle size less than 5 μm, more preferably less than 2 μm, with unimodal distribution to ensure sufficient mixing of the titanium dioxide and the lithium-based component. The mixture is then sintered in a gaseous atmosphere, created by a gas or gas mixture with constant flow at temperatures and times as indicated in Table 1. The gas or gas mixture includes a reducing agent and an inert gas or inactive gas in the amounts indicated in Table 1. The resulting lithium titanate has the formula $Li_4Ti_5O_{12-x}$ with $0<x<0.02$. Relevant properties of the lithium titanate of the present invention are also included in Table 1 below.

TABLE 1

| | Component | Example 1 | Example 2 | Example 3 |
|---|---|---|---|---|
| Mixture | Titanium Dioxide, pbw based on total weight of mixture | 72.992 | 80.655 | 76.632 |
| | Lithium-based Component A, pbw based on total weight of mixture | 27.008 | — | 14.178 |
| | Lithium-based Component B, pbw based on total weight of mixture | — | 19.345 | 9.190 |
| | Total | 100.0 | 100.0 | 100.0 |
| Gaseous Atmosphere | Reducing Agent A flow, L/(min · kg) based on total weight of mixture | 0.002 | — | — |
| | Reducing Agent B flow, L/(min · kg) based on total weight of mixture | — | 0.0025 | — |
| | Reducing Agent C flow, L/(min · kg) based on total weight of mixture | — | — | 0.05 |
| | Inert Gas A flow, L/(min · kg) based on total weight of mixture | 0.048 | 0.0225 | — |
| | Inactive Gas B flow, L/(min · kg) based on total weight of mixture | — | — | 0.095 |
| | Total | 0.05 | 0.025 | 0.1 |
| | Sintering Time, min | 120 | 100 | 180 |
| | Sintering Temperature, °C. | 850 | 900 | 800 |
| | X value in $Li_4Ti_5O_{12-x}$ | 0.009 ± 0.001 | 0.015 ± 0.001 | 0.005 ± 0.001 |
| | Reversible Electric Power-Generating Capacity, mA*hrs/g | 168 | 170 | 160 |
| | Crystal Structure Parameter (a), Å, at 300 K | 8.36012 | 8.35978 | 8.36023 |
| | Logarithm of DC Electronic Conductivity, (S cm$^{-1}$), at 300 K | −5.2 | −4.7 | −5.9 |

Lithium-based Component A is $Li_2CO_3$.
Lithium-based Component B is LiOH.
Reducing Agent A is $H_2$.
Reducing Agent B is $CH_4$ (methane).
Reducing Agent C is CO (carbon monoxide).
Inert Gas A is Argon.
Inactive Gas B is $N_2$ (nitrogen).

COMPARATIVE EXAMPLE

Conventional lithium titanate having the formula $Li_4Ti_5O_{12}$ is formed in the same manner as set forth above; however the reducing agent is not present in the gaseous atmosphere. The amounts of the components used to form the conventional lithium titanate are shown below in Table 2, along with relevant properties of the conventional lithium titanate.

TABLE 2

| | Component | Comp. Example 1 | Comp. Example 2 |
|---|---|---|---|
| Mixture | Titanium Dioxide, pbw based on total weight of mixture | 72.992 | 80.655 |
| | Lithium-based Component A, pbw based on total weight of mixture | 27.008 | — |
| | Lithium-based Component B, pbw based on total weight of mixture | — | 19.345 |
| | Total | 100.0 | 100.0 |
| Gaseous Atmosphere | Inert Gas A flow, L/(min · kg) based on total weight of mixture | 0.1 | — |
| | Inactive Gas B flow, L/(min · kg) based on total weight of mixture | — | 0.2 |
| | Total | 0.1 | 0.2 |
| | Sintering Time, min | 180 | 120 |
| | Sintering Temperature, °C. | 850 | 900 |
| | X value in $Li_4Ti_5O_{12-x}$ formula | 0 ± 0.0005 | 0 ± 0.0005 |
| | Reversible Electric | 145 | 150 |

TABLE 2-continued

| Component | Comp. Example 1 | Comp. Example 2 |
|---|---|---|
| Power-Generating Capacity, mA*hrs/g | | |
| Crystal Structure Parameter (a), Å, at 300 K | 8.36055 | 8.35915 |
| Logarithm of DC Electronic Conductivity, (S cm$^{-1}$), at 300 K | <−9 | ~−9 |

Results

With reference to the reversible electric power-generating capacity and the electronic conductivity of the Examples and the Comparative Example, it is apparent that the lithium titanates of the present invention exhibit higher electronic conductivity than conventional lithium titanates of the Comparative Examples, while exhibiting even higher reversible electric power-generating capacity.

Figure 4:
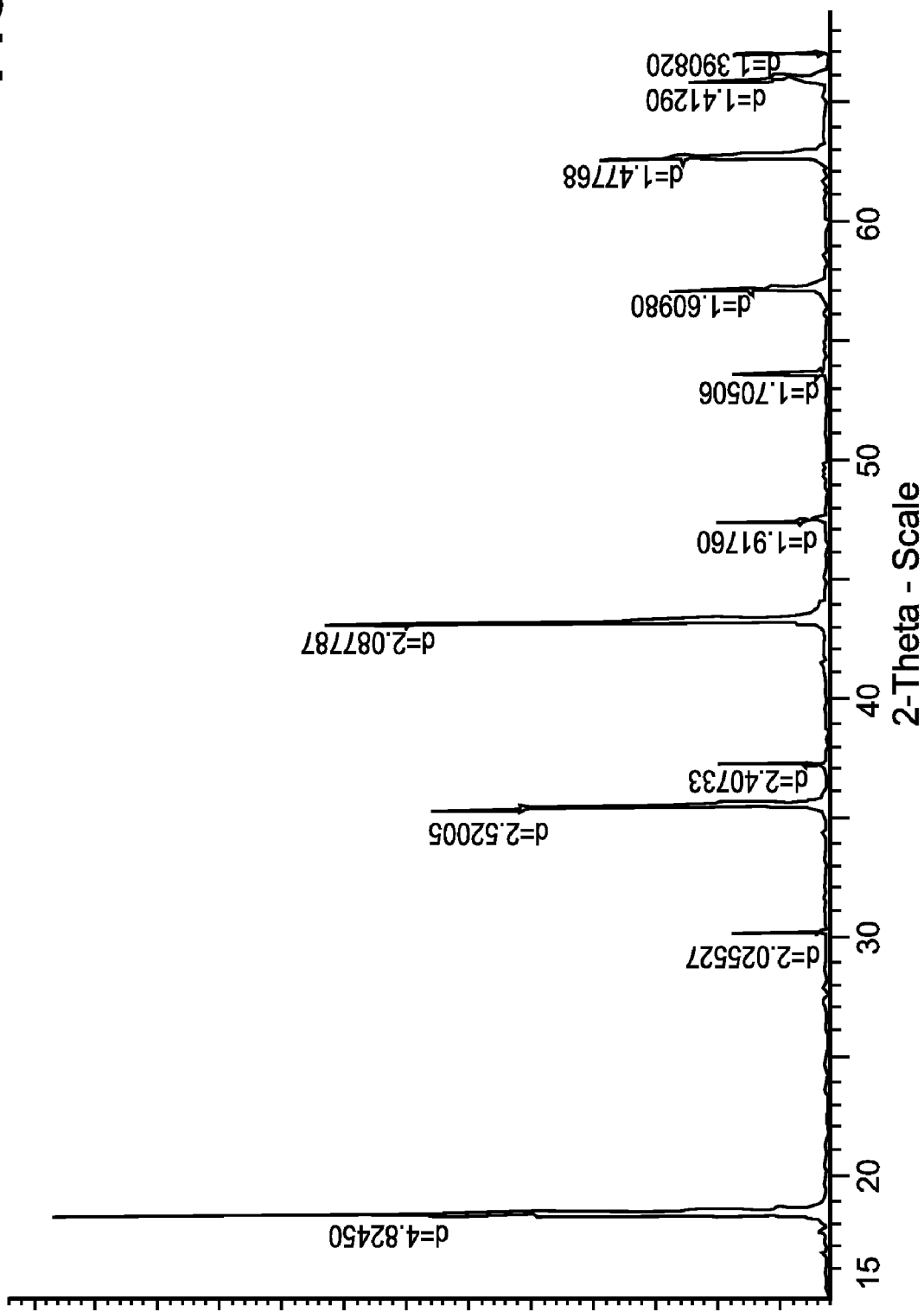
FIG. 4 is an X-ray diffraction spectra for conventional $Li_4Ti_5O_{12}$ of the prior art, synthesized according to Comp. Example 1 in Table 2.
Figure 5:
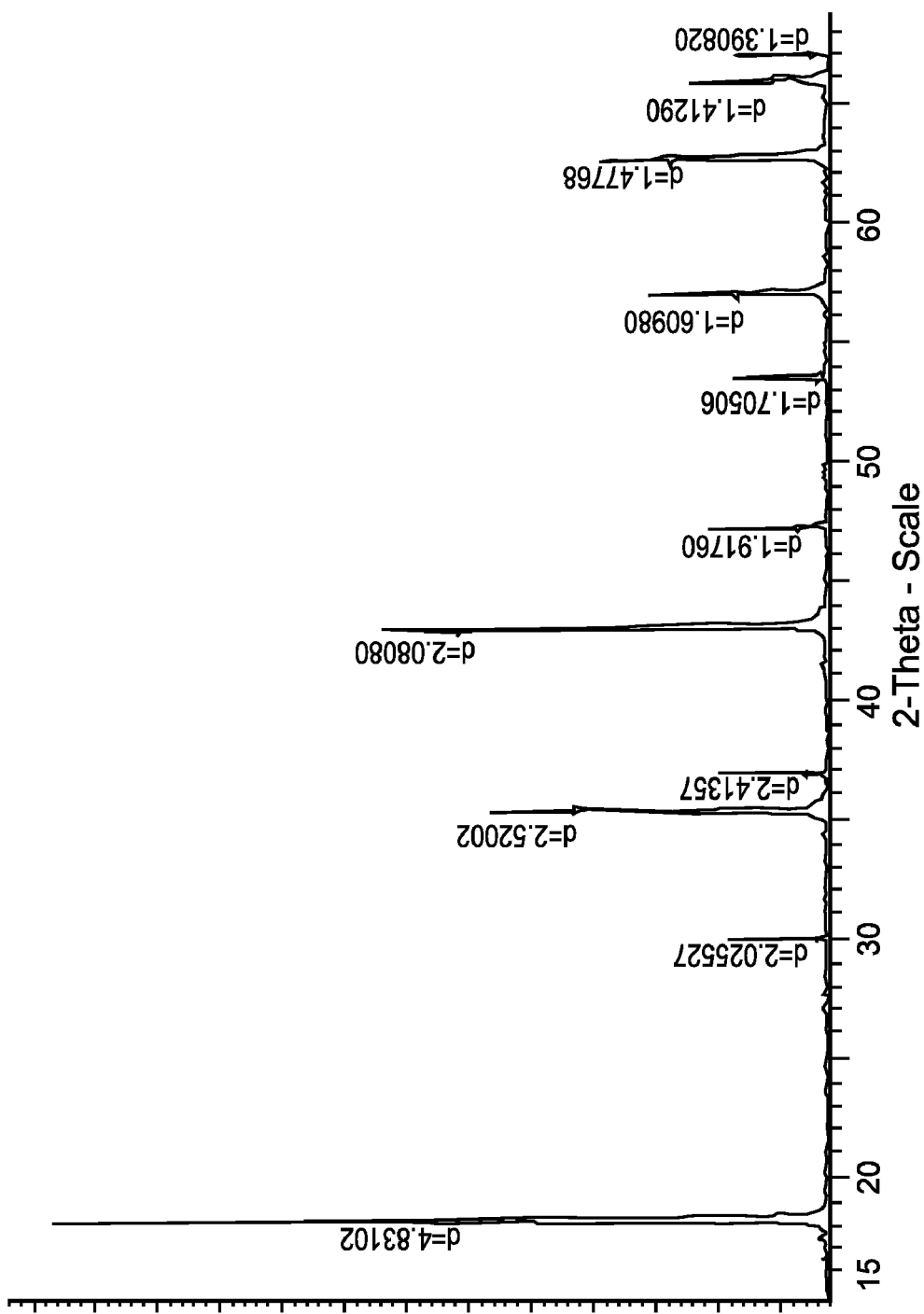
FIG. 5 is an X-ray diffraction spectra for $Li_4Ti_5O_{11.985}$ of the present invention, synthesized according to Example 2 in Table 1.

Specifically, XRD spectra are received on an x-ray diffractometer Bruker D4 on CuK$_\alpha$ radiation with Sol-X detector. All samples listed in Table 1 and 2 give well-defined spectra correspond to cubic structure (Sp. gr. Fd-3m (227)). Small amounts of residual TiO$_2$ (<0.5%) are present in most of samples. Using a full-profile analysis method, with conventional structure model (see for example, S. Scharner, W. Wepner, P. Schmid-Beurmann. Evidence of Two-Phase Formation upon Lithium insertion into the Li$_{1.33}$Ti$_{1.67}$O$_4$ Spinel, Journal of the Electrochemical Society. v. 146, I. 3, pp. 857-861, 1999), parameter (a) of a cubic crystal lattice is calculated, and is shown in the Tables 1 and 2. Two typical spectra, one for Li$_4$Ti$_5$O$_{12}$ of the prior art represented by Comp. Examples 1 and 2, and one for Li$_4$Ti$_5$O$_{11.985}$ of the present invention represented by Example 2, are presented on FIGS. 4 and 5, respectively.

Figure 6:
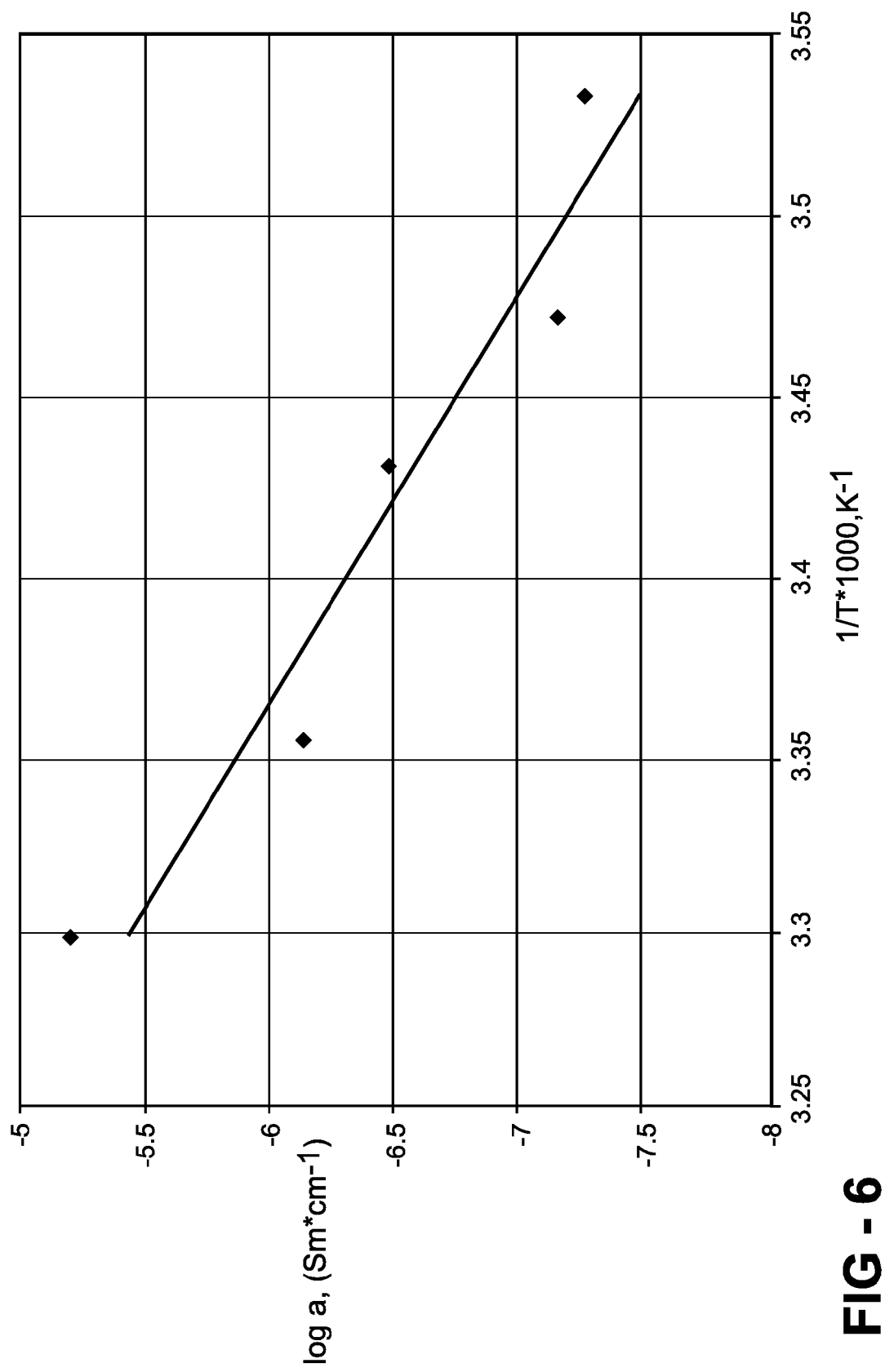
FIG. 6 is a graph showing a dependence of $\log(\sigma)$ vs. $1/T$ measured for $Li_4Ti_5O_{11.985}$ of the present invention, synthesized according to Example 2 in Table 1 and measured by the 4-probe method.

Electronic conductivity of the Examples is measured on 20 mm diameter, 2-3 mm thick pellets that have been pressed and tempered inside powder samples under synthesis conditions until an equilibrium state is reached. Measurements are made by the 4-probe method on direct current, under potential of 90 volts. Attempts to receive reliable data for Li$_4$Ti$_5$O$_{12}$ samples (Table 2, Comp. Examples 1 and 2) are unsatisfactory, as the conductivity of these samples lies very close to a low limit of measurement for this method. Therefore, only order of conductivity is determinate. Results of measurements for Li$_4$Ti$_5$O$_{11.985}$, synthesized according to Example 2 in Table 1, in a narrow temperature interval of about room temperature, are shown on FIG. 6. Main sources of measurement discrepancies are the nature of compacted powder samples with significant porosity, as well as proximity to grain boundaries and contact effects.

Figure 7:
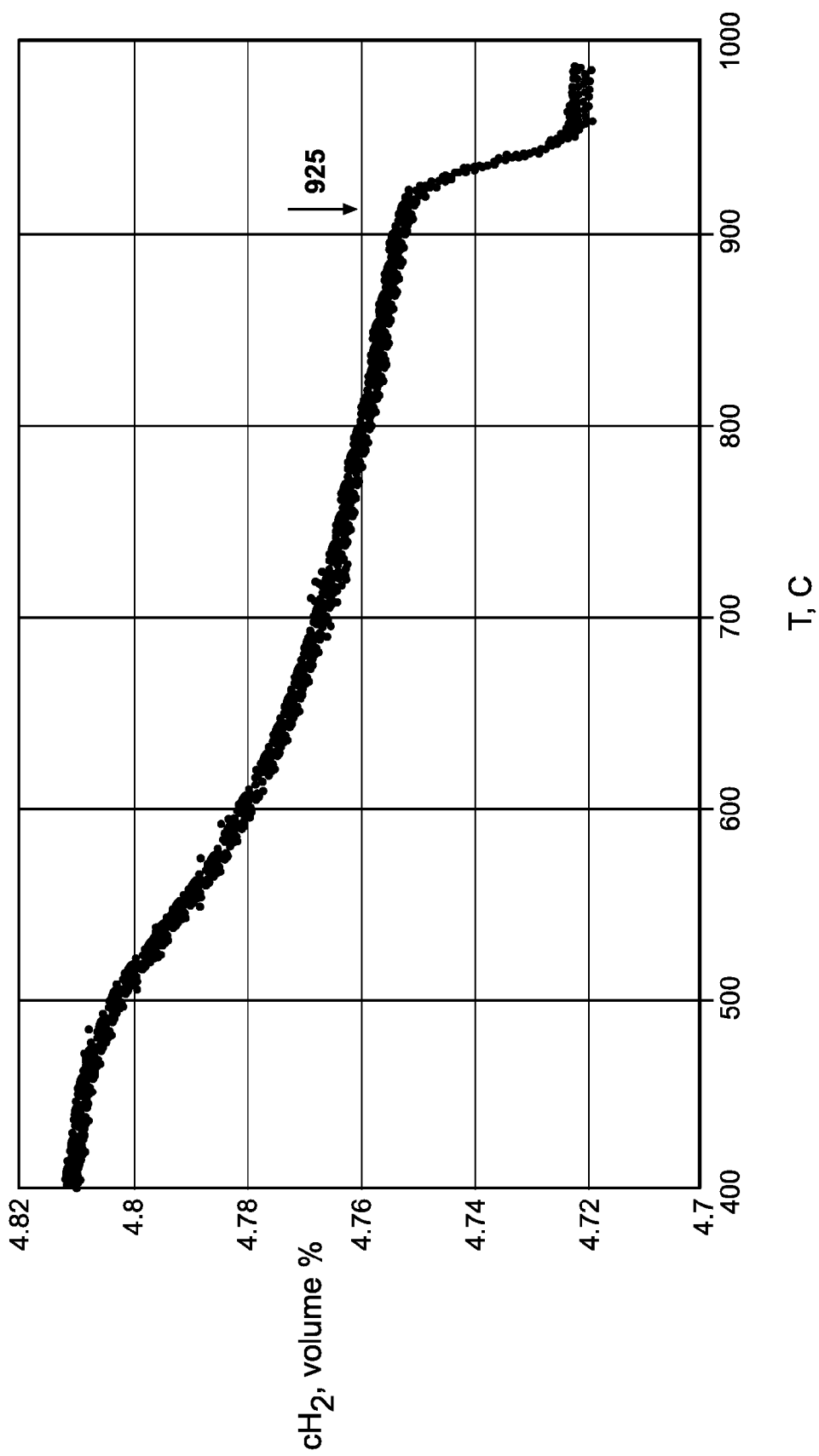
FIG. 7 is a kinetic curve of a sintering step whereby $Li_4Ti_5O_{12}$ is reduced by a $H_2$/Argon gas mixture (4.81 vol. % $H_2$), representing dependence of concentration of $H_2$ on temperature during heating with constant temperature increase of 2.5° C./min.
Figure 8:
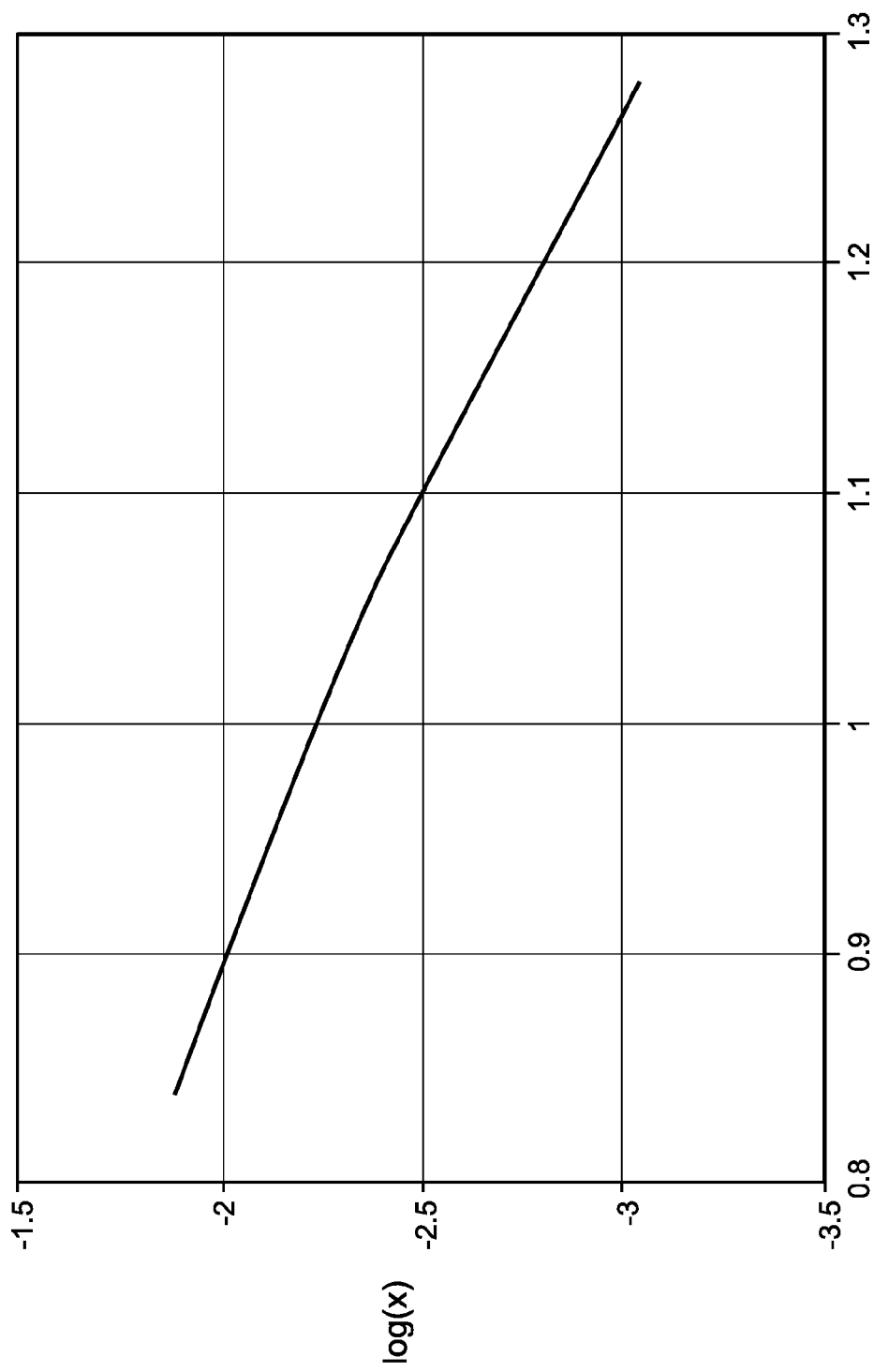
FIG. 8 is a kinetic curve of the sintering step of FIG. 7 in $\log(x)$ vs. $1/T$ coordinates, wherein x is x in $Li_4Ti_5O_{12-x}$.

The kinetics of the sintering step for reducing the Li$_4$Ti$_5$O$_{12}$ is tested through the Temperature Controlled Reduction method. During linear heating of samples under gaseous atmosphere including the reducing agent, gas concentration is measured after flowing past the sample. Referring to FIG. 7, dependence of concentration of hydrogen, i.e., the reducing agent, against temperature of Li$_4$Ti$_5$O$_{12}$ is shown. A difference between initial concentration of hydrogen and concentration of hydrogen after the gaseous atmosphere flows past the sample gives an amount of hydrogen used for the sintering process. By integration of this curve, using values of sample mass and gas mixture flow, it is possible to calculate the value of x in the formula Li$_4$Ti$_5$O$_{12-x}$ as a function of temperature. The reduction during the sintering step becomes appreciable after 450° C. and proceeds smoothly until 925° C. FIG. 8 shows a dependence of the logarithm of x in formula Li$_4$Ti$_5$O$_{12-x}$ against reverse absolute temperature (in Kelvin). This curve has an Arrhenius-like character and is close to linear in the temperature interval 500° C.<T<925° C.

Figure 9:
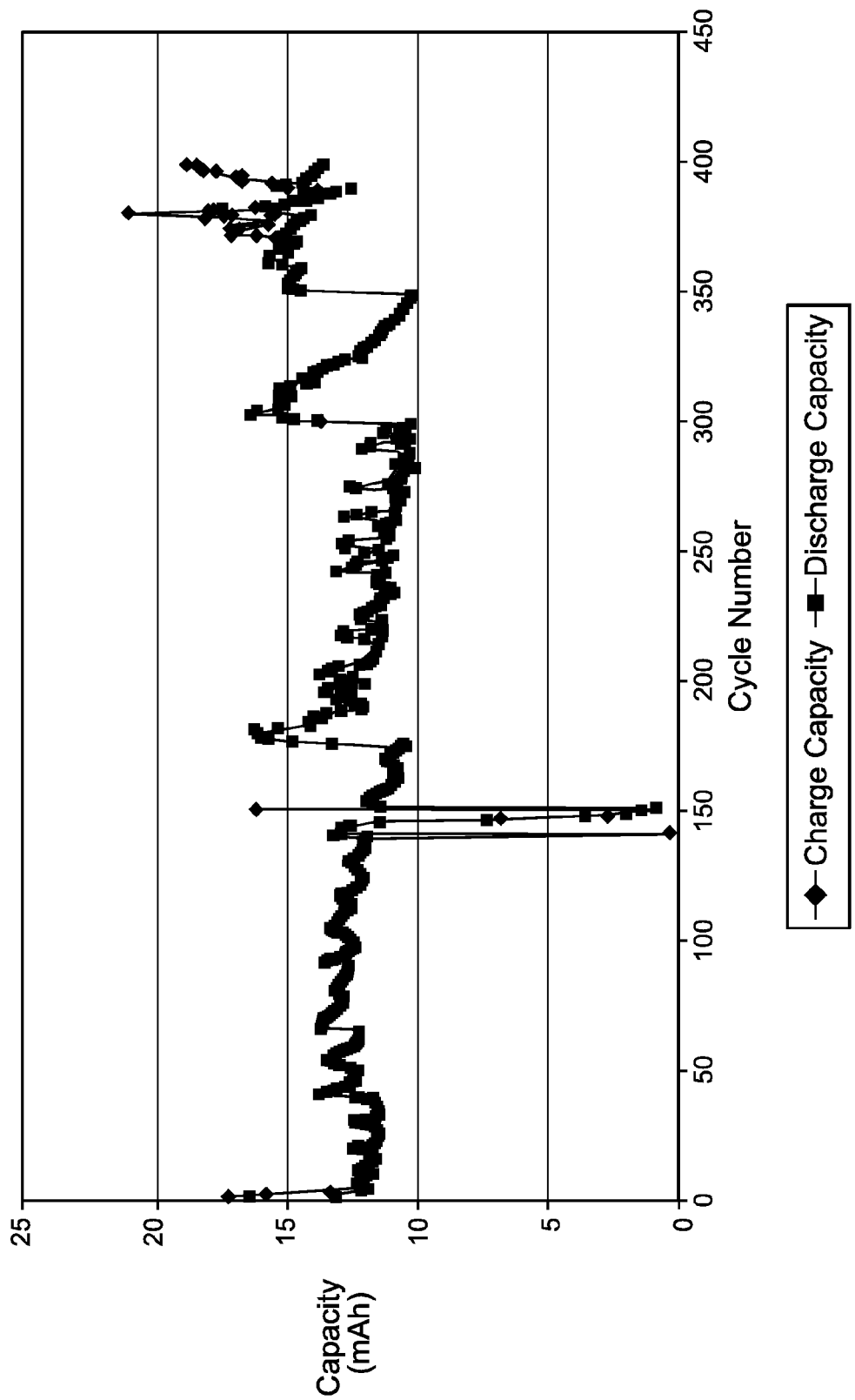
FIG. 9 is a graph showing a dependence of electric power generating capacity (mAh) vs. a number of cycles for a cell including an electrode with $Li_4Ti_5O_{12-x}$ of the present invention wherein a counter electrode is lithium metal.
Figure 10:
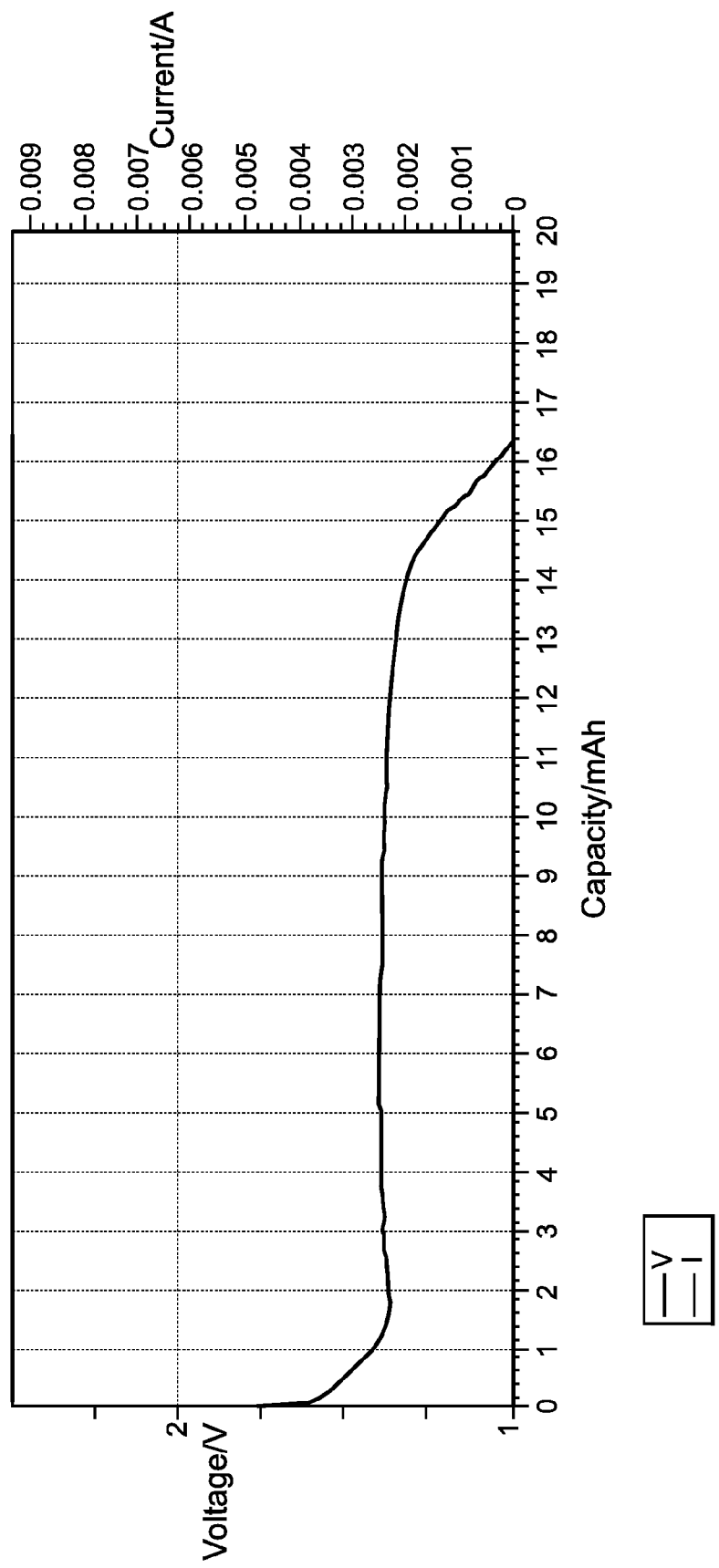
FIG. 10 is a graph showing a first discharge of a cell including an electrode with $Li_4Ti_5O_{12-x}$ of the present invention wherein a counter electrode is lithium metal.
Figure 11:
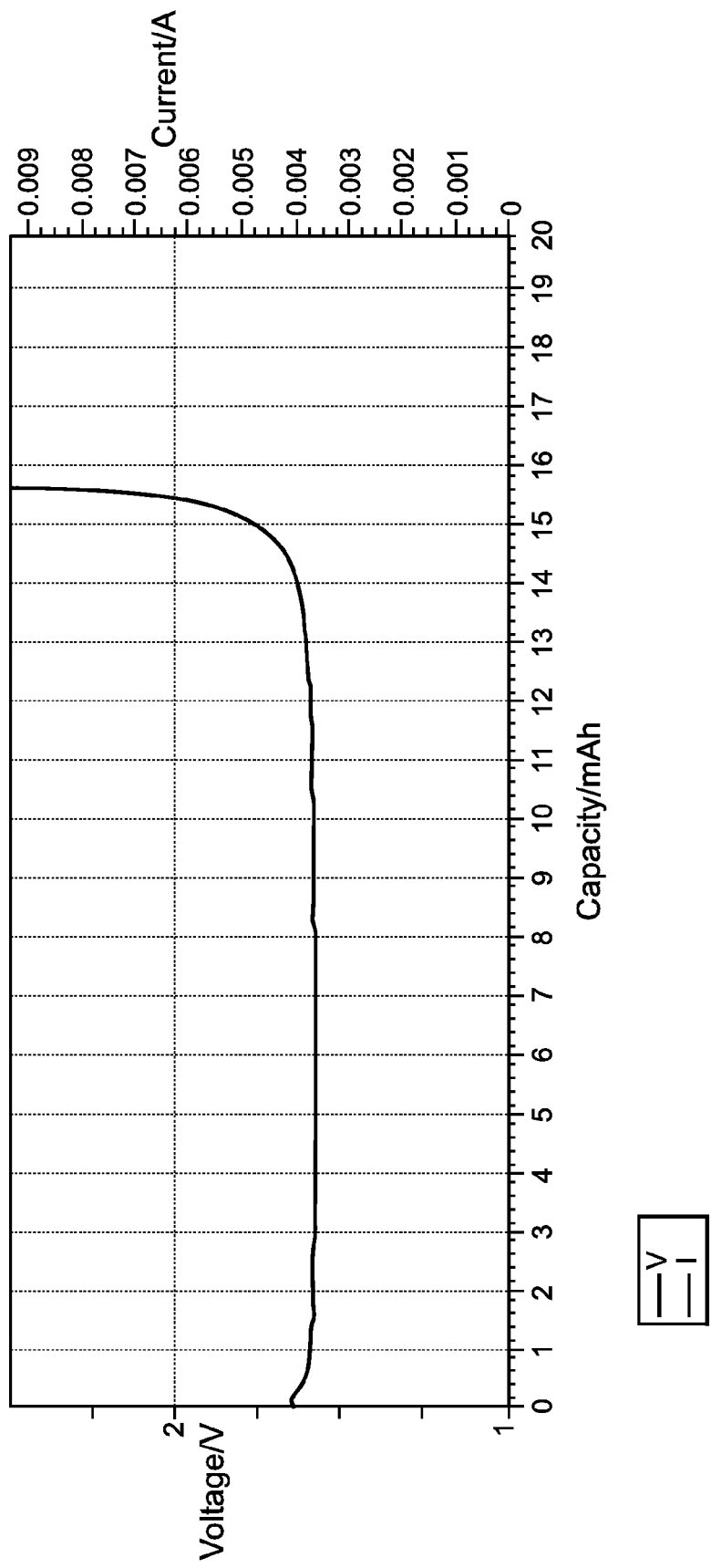
FIG. 11 is a graph showing a second charge of the cell including the electrode with $Li_4Ti_5O_{12-x}$ of the present invention wherein the counter electrode is lithium metal.
Figure 12:
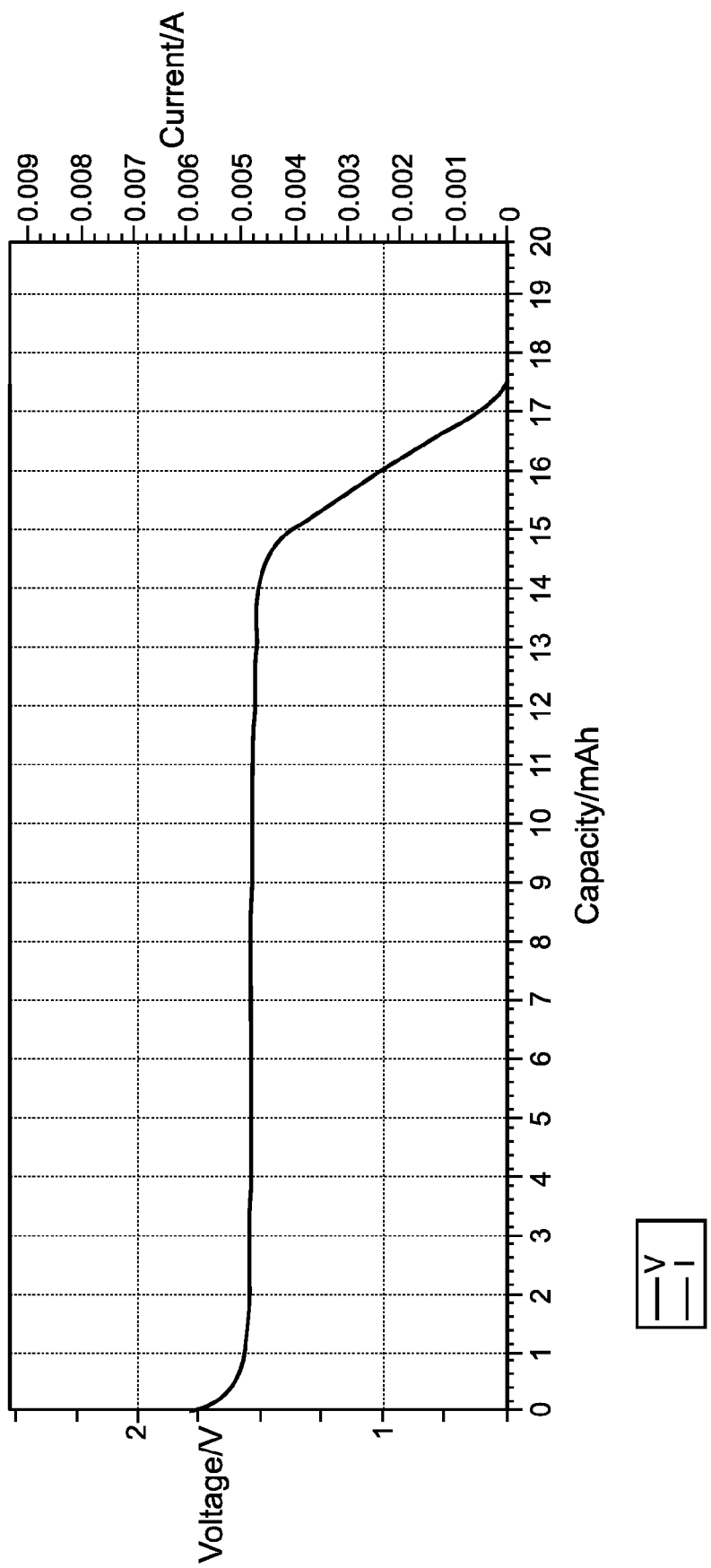
FIG. 12 is a graph showing a $382^{nd}$ discharge of the cell including the electrode with $Li_4Ti_5O_{12-x}$ of the present invention wherein the counter electrode is lithium metal.
Figure 13:
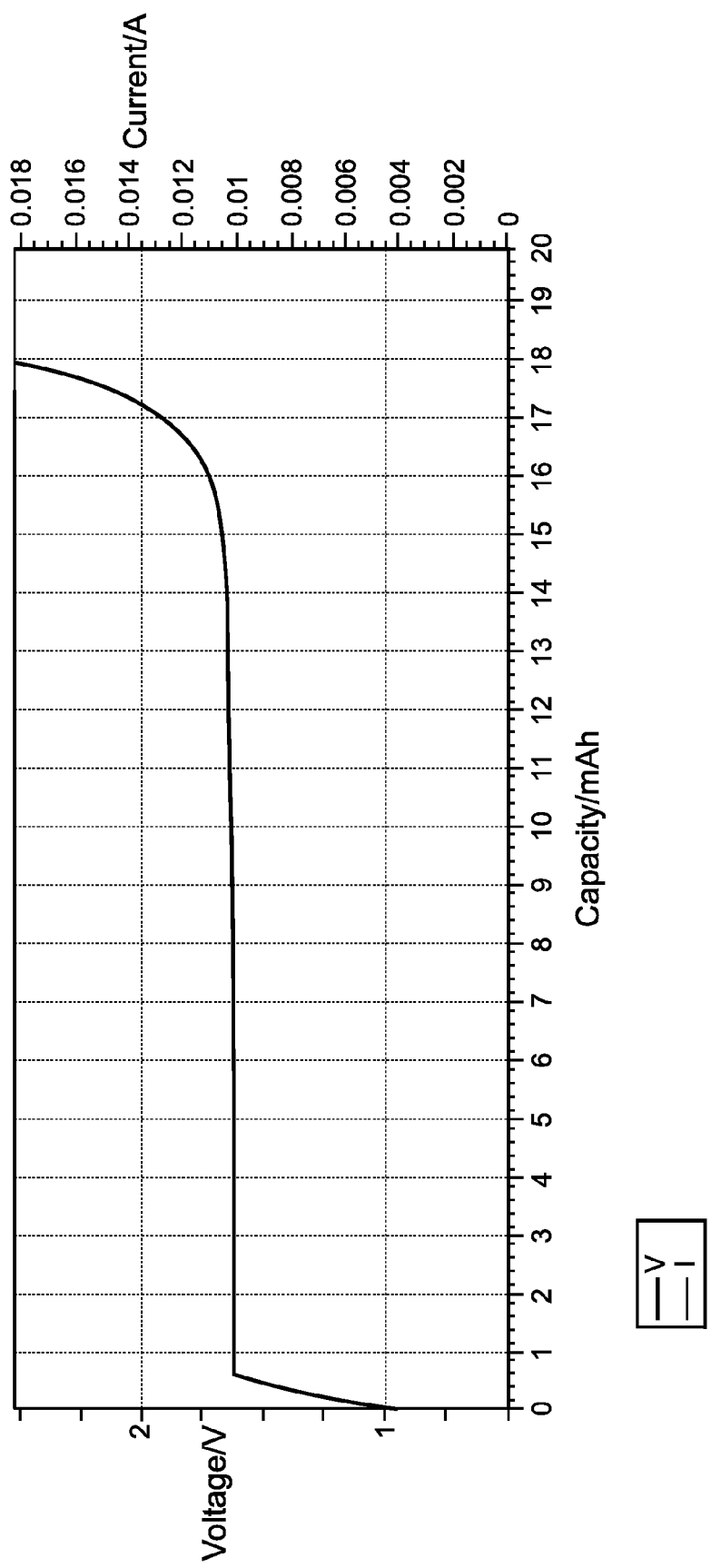
FIG. 13 is a graph showing a $382^{nd}$ charge of the cell including the electrode with $Li_4Ti_5O_{12-x}$ of the present invention wherein the counter electrode is lithium metal.

FIG. 9 shows that the lithium-based cell that includes the Li$_4$Ti$_5$O$_{12-x}$ maintains electric power generating capacity after many cycles, and FIGS. 10-13 illustrate flat charge and discharge curves of the Li$_4$Ti$_5$O$_{12-x}$, even after many cycles of charge and discharge.

The present invention has been described herein in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims.

What is claimed is:

1. An active material suitable for use in lithium cells, said active material comprising:
   lithium titanate having a surface; and
   a material selected from the group consisting of polyethylene oxide, polymethylene-polyethylene oxide, polyphosphaznes and combinations thereof disposed on said surface of said lithium titanate, said material being non-reactive with an electrolyte within a range of potential vs. lithium of from 0 V to 4 V while said active material is in the presence of the electrolyte.

2. An active material as set forth in claim 1 wherein said material does not decompose the electrolyte.

3. An active material as set forth in claim 1 wherein said lithium titanate has the following formula:

Li$_4$Ti$_5$O$_{12-x}$ wherein x is greater than 0 and less than 12.

4. An active material as set forth in claim 3 wherein x is less than 0.02.

5. An active material as set forth in claim 4 wherein an average valence of titanium in said lithium titanate is less than 4.

6. A lithium cell comprising said active material as set forth in claim 1.

7. A lithium cell as set forth in claim 6 further comprising an electrolyte.

8. A lithium cell comprising at least two electrodes each comprising lithium titanate, said lithium cell having an electrode potential versus lithium in a general condition of use that does not drop below 1.3 V.

9. A lithium cell as set forth in claim 8 wherein said lithium titanate has the following formula:

Li$_4$Ti$_5$O$_{12-x}$ wherein x is greater than 0 and less than 12.

10. A lithium cell as set forth in claim 9 wherein x is less than 0.02.

11. A lithium cell as set forth in claim 10 wherein an average valence of titanium in said lithium titanate is less than 4.

12. A lithium cell comprising:
   lithium titanate;
   lithium bis(oxalate)borate; and
   a surface film disposed on said lithium titanate and formed by said electrolyte.

13. A lithium cell as set forth in claim 12 wherein said lithium titanate has the following formula:

$$Li_4Ti_5O_{12-x}$$

wherein x is greater than 0 and less than 12.

14. A lithium cell as set forth in claim 13 wherein x is less than 0.02.

15. A lithium cell as set forth in claim 14 wherein an average valence of titanium in said lithium titanate is less than 4.

16. A lithium cell comprising:
at least one electrode comprising lithium titanate; and
a non-fluorinated binder, wherein said lithium titanate has the following formula:

$$Li_4Ti_5O_{12-x}$$

wherein x is greater than 0 and less than 12.

17. A lithium cell as set forth in claim 16 wherein x is less than 0.02.

18. A lithium cell as set forth in claim 17 wherein an average valence of titanium in said lithium titanate is less than 4.

19. A lithium cell comprising at least one electrode, said electrode comprising:
a first lithium titanate having the following formula:

$$Li_4Ti_5O_{12-x}$$

and
a second lithium titanate different from said first lithium titanate, said second lithium titanate having the following formula:

$$Li_4Ti_5O_{12-x}$$

wherein x is greater than 0 and less than 12;
said second lithium titanate being present in said electrode in an amount greater than that of said first lithium titanate.

20. A lithium cell as set forth 19 wherein said electrode includes at least 10% more of said second lithium titanate relative to said first lithium titanate.

21. A lithium cell as set forth in claim 20 wherein x is less than 0.02.

22. A lithium cell as set forth in claim 21 wherein an average valence of titanium in said lithium titanate is less than 4.

23. A lithium cell comprising:
an anode and cathode wherein said cathode comprises a lithium titanate and a gas absorbing material and
a gas absorbing material, wherein said lithium titanate and said gas absorbing material are mixed to form an electrode.

24. A lithium cell as set forth in claim 23 wherein said the gas absorbing material is selected from the group of ZnO, NaAlO$_2$, silicon, and combinations thereof.

25. A lithium cell as set forth in claim 23 further comprising a separator and wherein gas absorbing material is retained by said separator.

26. A lithium cell as set forth in claim 23 further comprising a case and wherein said gas absorbing material is retained by said case.

27. A lithium cell as set forth in claim 23 wherein said lithium titanate has the following formula:

$$Li_4Ti_5O_{12-x}$$

wherein x is greater than 0 and less than 12.

28. A lithium cell as set forth in claim 27 wherein x is less than 0.02.

29. A lithium cell as set forth in claim 28 wherein an average valence of titanium in said lithium titanate is less than 4.

30. A lithium cell as set forth in claim 28 wherein said the gas absorbing material is selected from the group of ZnO, NaAlO$_2$, silicon, and combinations thereof.

31. A lithium cell comprising:
an electrode comprising a lithium titanate having the following formula:

$$Li_4Ti_5O_{12-x}$$

wherein x is greater than 0 and less than 12.

32. A lithium cell as set forth in claim 31 wherein x is less than 0.02.

* * * * *